United States Patent [19]

Becker

[11] Patent Number: 4,787,261

[45] Date of Patent: Nov. 29, 1988

[54] DEVICE FOR SETTING A RELATIVE ROTATIONAL POSITION OF A GEARWHEEL AND A RING GEAR WHICH ARE COAXIALLY MOUNTED

[75] Inventor: Willi Becker, Bammental, Fed. Rep. of Germany

[73] Assignee: Heidelberger Druckmaschinen AG, Heidelberg, Fed. Rep. of Germany

[21] Appl. No.: 35,067

[22] Filed: Apr. 6, 1987

[30] Foreign Application Priority Data

Apr. 4, 1986 [DE] Fed. Rep. of Germany ....... 3611325

[51] Int. Cl.[4] ........................ B41F 13/24; F16H 55/00

[52] U.S. Cl. ........................................ 74/439; 101/248

[58] Field of Search ........................ 101/229, 230, 248; 74/439, 440, 444

[56] References Cited

U.S. PATENT DOCUMENTS

| | | | |
|---|---|---|---|
| 1,340,355 | 5/1920 | Wood | 101/378 |
| 4,147,105 | 4/1979 | Becker | 101/230 |
| 4,444,106 | 4/1984 | Frenzel et al. | 101/230 |
| 4,457,231 | 7/1984 | Kawaguchi | 101/248 |

FOREIGN PATENT DOCUMENTS

| | | | |
|---|---|---|---|
| 3127539 | 6/1982 | Fed. Rep. of Germany . | |
| 8319431 | 2/1984 | Fed. Rep. of Germany . | |
| 135812 | 5/1979 | German Democratic Rep. | 101/248 |
| 58-71162 | 4/1983 | Japan . | |
| 58-78763 | 5/1983 | Japan . | |
| 2142908 | 1/1985 | United Kingdom | 101/230 |

*Primary Examiner*—Lawrence Staab

*Attorney, Agent, or Firm*—Herbert L. Lerner; Laurence A. Greenberg

[57] ABSTRACT

A device for setting a relative rotational position of a gearwheel and a ring gear disposed coaxially mounted and turnable on an annular extension of the gearwheel includes a plurality of radially extending pressure levers actuatable in common by an axially adjustable, centrically disposed adjusting element for releasing a spring-biased positive connection of mutually engaging faces of the gearwheel and the ring gear by reducing the spring bias acting upon the faces, the pressure levers being loosely disposed between the annular extension of the gearwheel and a clamping disc adjacent thereto, the pressure levers being received in radial grooves formed in the clamping disc and being pivotally braced at a first contact region located between the ends thereof against one of the annular extension and the clamping disc, the adjusting element being displaceable over a distance, during a first portion of which the spring bias increases from a relatively low value to a value necessary for maintaining the relative rotational position of the gearwheel and the ring gear and, during a second portion of the distance displaceable by the adjusting element, the spring bias necessary for maintaining the relative rotational position of the gearwheel and the ring gear is at least maintained, and an electric switch connected in a supply-current circuit of a machine drive is actuatable by the element.

14 Claims, 6 Drawing Sheets

DEVICE FOR SETTING A RELATIVE ROTATIONAL POSITION OF A GEARWHEEL AND A RING GEAR WHICH ARE COAXIALLY MOUNTED

The invention relates to a device for setting or adjusting a relative rotational position of a gearwheel and a ring gear disposed coaxially mounted and turnable on an annular extension of the gearwheel, and more particularly wherein a plurality of radially extending pressure levers are actuatable in common by an axially adjustable, centrically disposed adjusting element for releasing a connection or coupling of mutually engaging faces of the gearwheel and the ring gear, by reducing a spring bias acting upon the faces, the connection being a positive connection effected by spring-biasing.

When converting, for example, a sheet-fed rotary printing machine selectively either to single sheet or perfector printing, it is necessary to adjust the relative rotational position between a gearwheel mounted on a shaft of a turning cylinder and a ring gear coaxially mounted therewith. During the operation of the printing machine, the ring gear is clamped to the gearwheel. In this regard, considerable forces are required in order to ensure that the relative rotational position of the ring gear and the gearwheel is reliably fixed during operation. To adjust the rotational setting or position, the clamping action is released, the ring gear is turned through a desired angle, and then the connection thereof with the gearwheel so as to be fixed against mutual turning is again produced.

In heretofore known devices of this general type, loosening and tightening of from four to six screws o bolts is necessary.

To simplify the conversion, devices have become known (German Patent 31-27539 and Japanese Patent Sho 58-78763) wherein turning of the screws or bolts is effected via a common drive with gears or worms.

A connection or coupling device has also become known heretofore (Japanese Patent Sho 58-71162) wherein a positive connection between the ring gear and the gearwheel is achieved by means of a plurality of clamping elements arranged in vicinity of the circumference of the device, the clamping elements being releasable via levers from a centrally disposed bolt. These levers are pivotally mounted on pins and have threaded connections by means of which the adjusting movement of the central bolt is transmitted to the parts of the coupling or connection.

The heretofore known devices have a disadvantage in that start-up of the machine is possible if, after conversion has taken place, the ring gear has not been sufficiently tightly or firmly connected to the gearwheel. As a result thereof, the relative rotary position or setting between the ring gear and the gearwheel can shift during the operation of the printing machine, for example, which can result in damage of the machine.

It is accordingly an object of the invention to provide a device for setting a relative rotational position of a gearwheel and a ring gear disposed coaxially therewith which ensures, with minimal manufacturing and assembly expense, a reliable mutual connection or coupling of a gearwheel and a ring gear during operation of a printing machine, for example, which is furnished therewith.

With the foregoing and other objects in view, there is provided, in accordance with the invention, a device for setting a relative rotational position of a gearwheel and a ring gear disposed coaxially therewith and turnable on an annular extension of the gearwheel, comprising a plurality of radially extending pressure levers actuatable in common by an axially adjustable, centrically disposed adjusting element for releasing a spring-biased positive connection of mutually engaging faces of the gearwheel and the ring gear by reducing the spring bias acting upon the faces, the pressure levers being loosely disposed between the annular extension of the gearwheel and a clamping disc adjacent thereto, the pressure levers being received in radial grooves formed in the clamping disc and being pivotally braced at a first contact region located between the ends thereof against one of the annular extension and the clamping disc, the adjusting element being displaceable over a distance, during a first portion of which the spring bias increases from a relatively low value to a value necessary for maintaining the relative rotational position of the gearwheel and the ring gear and, during a second portion of the distance displaceable by the adjusting element, the spring bias necessary for maintaining the relative rotational position of the gearwheel and the ring gear is at least maintained, and an electric switch connected in a supply-current circuit of a machine drive is actuatable by the element.

The device according to the invention has the advantage that a setting or adjustment of the relative rotational position between the gearwheel and the ring gear is possible with relatively low energy expenditure. Operation or servicing of the printing machine, for example, is thereby facilitate. By this facilitation of operation, the reliability is already enhanced against faulty operation.

Assurance is provided that the printing machine, for example, can be set into operation only when a sufficiently tight or firm connection or coupling exists between the gearwheel and the ring gear. The instant the adjusting element for loosening or releasing the ring gear is moved out of its end position, the current-supply circuit of the drive unit of the machine is initially interrupted and a reduction in the coupling or connection forces is then effected.

Moreover, pivot or journal bearings for the pressure levers and threaded connections for transmitting the setting or adjustment movement of a central adjusting element to the parts of the connection or coupling are superfluous so that manufacture and assembly require less expense.

In accordance with another feature of the invention, the pressure levers have relatively short lever arms between the first contact regions, respectively, and respective second contact regions located thereon, and have relatively long lever arms between the first contact regions, respectively, and respective third contact regions also located thereon, the pressure levers being braced at the first contact regions, respectively, against the clamping disc, the second contact regions, respectively, engaging a face of the ring gear facing away from the gearwheel, the third contact regions, respectively, being adjacent the axis of the gearwheel, and including spring means for applying an axially directed force to the third contact regions, the adjusting element being axially displaceable, during the first portion of the distance, independently of the spring means and, during the second portion of the distance, performing a movement loading the spring means.

This construction has the advantage that only one compression spring is required which can be assembled of cup springs in a suitable manner, and that the adjusting element travels free-of-loading over the path necessary for actuating the switch.

In accordance with another feature of the invention, there is provided a centric pin fixed against turning disposed coaxially with the gearwheel and a shaft carrying the gearwheel, the pin carrying the spring means and an axial thrust bearing, the pin also having a threaded section whereon the adjusting element is mounted.

In accordance with an additional feature of the invention, the spring means comprise a compression spring formed of cup springs.

In accordance with an added feature of the invention, the adjusting element is formed with an annular groove, and including an actuating element for the electric switch engaging in the annular groove.

In accordance with a further feature of the invention, the adjusting element is formed with an annular groove, and including a stop for limiting adjustment travel of the adjusting element, the stop engaging in the annular groove.

In accordance with again another feature of the invention, the third contact regions of the pressure levers, respectively, engage a diametrically enlarged disc of the axial thrust bearing.

In accordance with again a further feature of the invention, there is provided a plurality of springy clamping elements distributed around the circumference of the ring gear for clamping the ring gear between the gearwheel and the clamping disc, the pressure levers being braced at the first contact regions, respectively, thereof against an end face of the annular extension of the gearwheel, the second contact regions, respectively, of the pressure levers being braced against the clamping disc at respective radially outer regions of the radial grooves, and the third contact regions, respectively, of the pressure levers being braced against an axial thrust bearing centrically inserted in the clamping disc and axially adjustable by means of the adjusting element, a respective relatively short lever arm being formed between the respective first and second contact regions of the pressure levers, and a respective relatively long lever arm being formed between the respective first and third contact regions of the pressure levers.

This construction of the device according to the invention also has the advantage that the adjusting element is able to be turned relatively easily within the travel path necessary for actuating the electric switch. Moreover, due to the application of force to the respective third contact region in a direction opposite to the application of the spring force of the clamping elements, the clamping disc is loosened from the ring gear.

In accordance with again an added feature of the invention, the adjusting element comprises a bolt threadedly secured in a threaded bore formed in the clamping disc, an end of the bolt engaging in a centric bore formed in a pressure flange, the pressure flange extending into a centric recess formed in the clamping disc, and the pressure flange being in engagement with the third contact regions of the pressure levers, respectively, via a side of a pressure ring of the axial thrust bearing which faces away from the clamping disc.

In accordance with still another feature of the invention, there are provided hardened intermediate members disposed at locations of the gearwheel and of the clamping disc which come into contact with the pressure levers.

In accordance with still an additional feature of the invention, the intermediate members disposed at the locations of the clamping disc are formed as threaded pins.

In accordance with an additional feature of the invention, the pressure levers have relatively short lever arms between the first contact regions and second contact regions thereof, respectfully, and have relatively long lever arms between the first contact regions and third contact regions thereof respectively, and are in contact with the clamping disc via the first contact regions, respectively, and with an end face of the ring gear facing away from the gearwheel via the second contact regions respectively, the adjusting element being centrically inserted into the clamping disc and the pressure levers being elastically deformable by application of a force from the adjusting element on the third contact regions, respectively.

This construction requires only very few structural components and is therefore especially simple to produce.

In accordance with an added feature of the invention, the adjusting element comprises a sleeve having an internal and an external thread and being threadedly mounted in a centric threaded bore formed in the clamping disc, and a bolt mounted in the sleeve and cooperatively connected with the internal thread of the sleeve, the bolt being axially displaceable yet fixed against turning, the third contact region of the pressure levers, respectively, being in contact with a contact surface of a head of the bolt, the external and the internal threads of the sleeve having respective pitches which differ slightly from one another.

By means of this construction, travel of the adjusting element for actuating the electric switch is produced in an advantageous manner.

In accordance with a concomitant feature of the invention, the device according to the invention includes means for limiting travel of the adjusting element.

Other features which are considered as characteristic for the invention are set forth in the appended claims.

Although the invention is illustrated and described herein as embodied in a device for setting a relative rotational position of a gearwheel and a ring gear which are coaxially mounted, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Like parts are identified by the same reference numerals in all of the figures.

Figure 1:
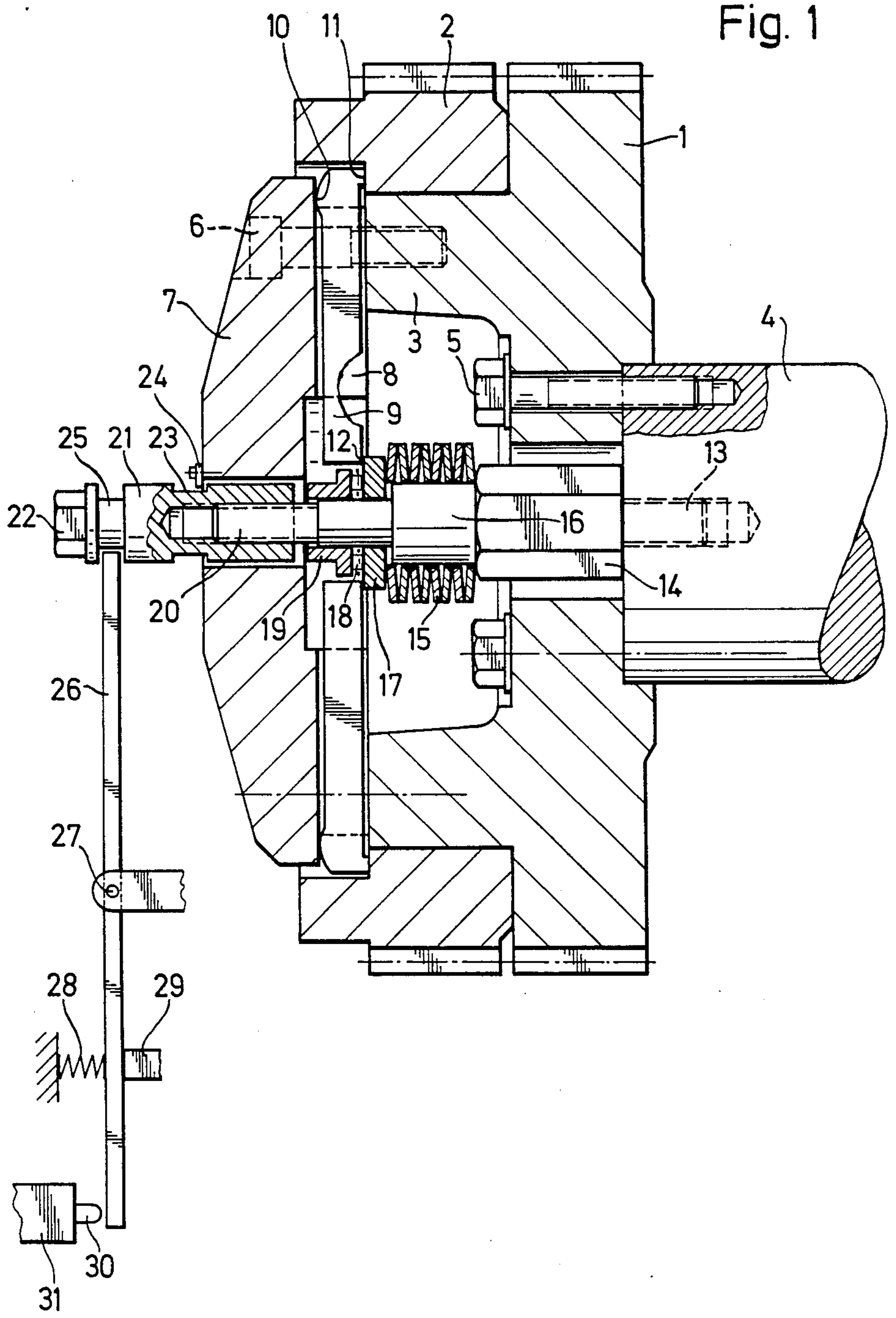
FIG. 1 is a longitudinal or axial sectional view of a first embodiment of a device for setting or adjusting a relative rotational position of a gearwheel and a ring gear which are coaxially mounted.
Figure 2:
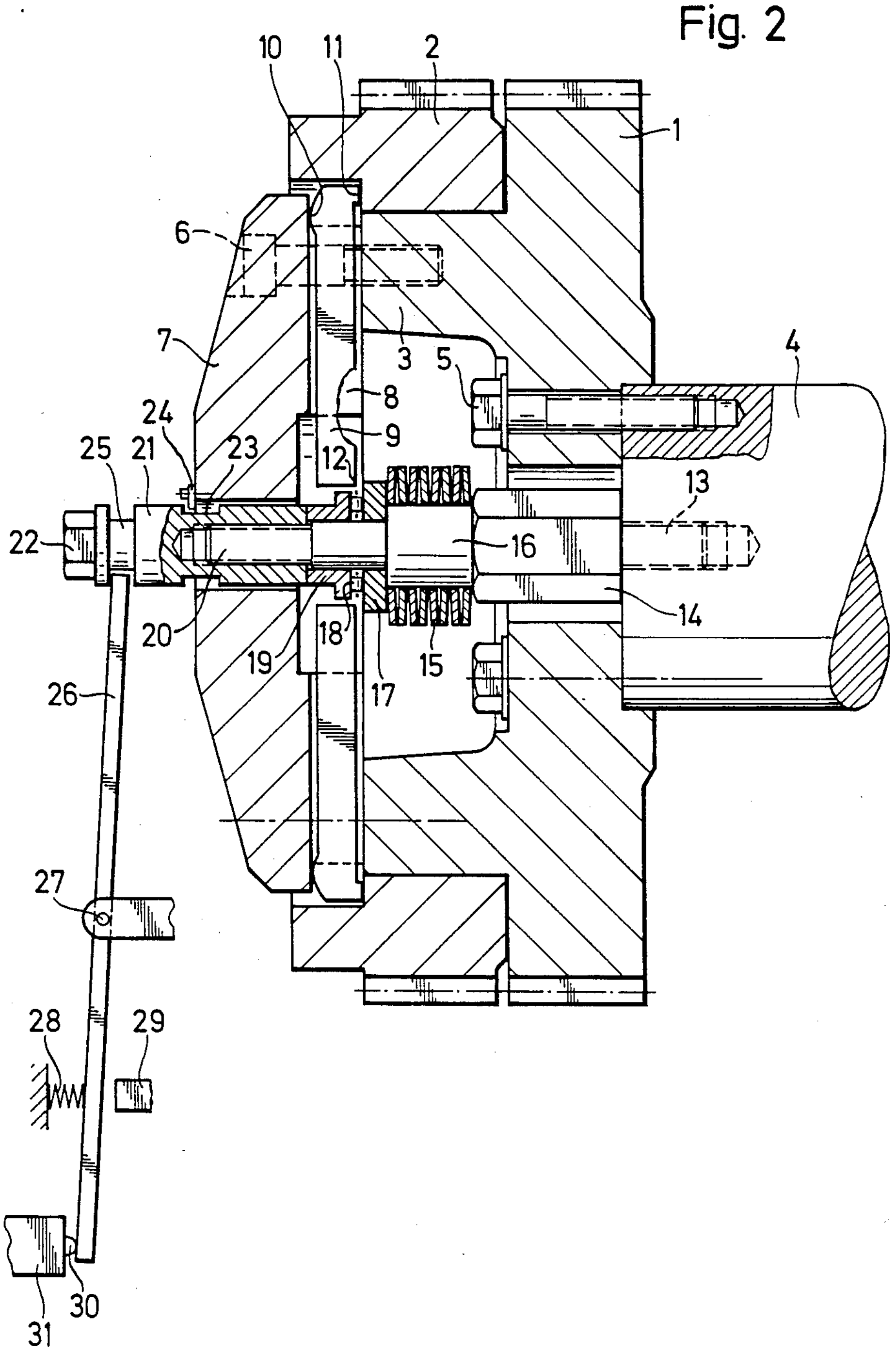
FIG. 2 is another view of FIG. 1 showing the device in another phase of operation thereof.
Figure 3:
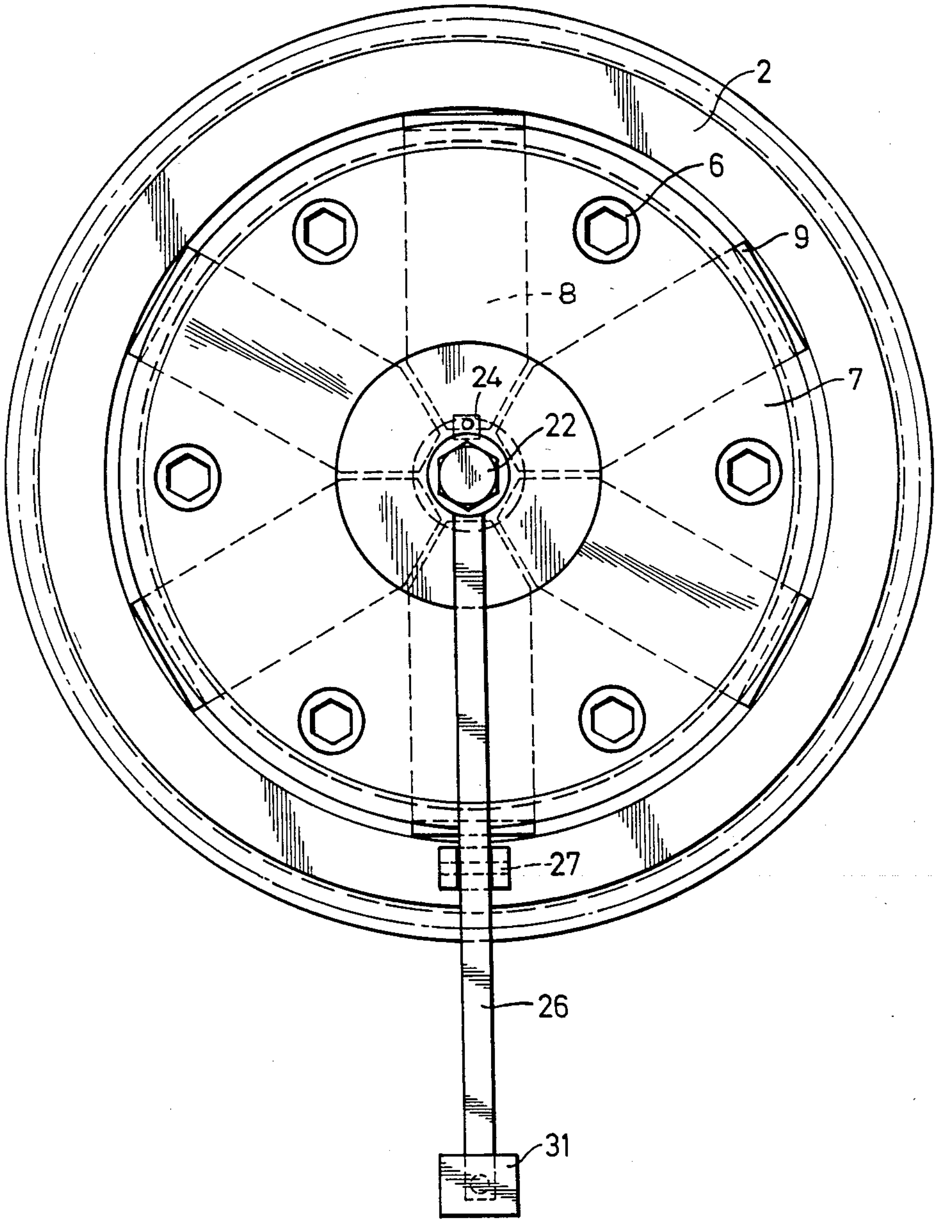
FIG. 3 is a front end view of FIG. 1.

Referring now to the drawing and, first, particularly to FIGS. 1 and 3 thereof, there is shown an embodiment of a device according to the invention, namely for setting or adjusting a relative rotational position of a gearwheel 1 and a ring gear 2 which are coaxially mounted, the gearwheel 1 being disposed at the end of a shaft 4. Bearings for the shaft 4, a turning drum carried by the shaft 4 as well as other parts of a printing machine, for example, are not illustrated in FIGS. 1 to 3 because they are not necessary for explaining the invention of the instant application. The gearwheel 1 is held on the shaft 4 by several bolts of which only one bolt 5 is fully illustrated in FIGS. 1 and 2.

A ring gear 2 is rotatably mounted on an annularly or ring shaped extension or projection 3 of the gearwheel 1. A clamping disc 7 is fastened by bolts 6 to an end face of the ring shaped extension 3 and is formed with six radial grooves 8 (note especially FIG. 3) in a side thereof facing towards the gearwheel 1, each of the grooves 8, respectively, receiving a likewise radially extending pressure lever 9 therein.

The pressure levers 9 are formed with a first contact region 10 for bracing the pressure levers 9 against the clamping disc 7, a second contact region 11 disposed at the radially outer end of the levers 9 for transferring the clamping force to the ring gear 2, and a third contact region 12 located at the radially inner end of the levers 9 for introducing the lever force. A lever arm formed between the contact regions 10 and 12 is considerably greater than a lever arm formed between the contact regions 10 an 11, so that, by applying a relatively low force to the contact regions 12, the ring gear 2 is clamped with a relatively high force between the pressure levers 9 and the gearwheel 1, resulting in a positive connection or coupling between the ring gear 2 and the gearwheel 1.

A pin 13 is centrally screwed into the end face of the shaft 4 and is formed of several sections in longitudinal direction thereof. A first section 14 has a hexagonal cross section for screwing in the pin 13 and serves simultaneously as an abutment or counter-bearing for a compression spring 15 in which a second section 16 of the pin 13 is received. The compression spring 15 is formed of cup springs which are assembled in a conventional manner so that a suitable spring travel for an appropriate spring constant is produced.

A washer 17, a cage with rollers 18 and a sleeve 19, which together form an axial thrust bearing, are mounted axially displaceably on a third section of the pin 13 which has a smaller diameter than that of the section 16. The washer 17 transmits the force of the compression spring 15 to the contact regions 12 of the pressure levers 9. The clamping action between the gearwheel 1 and the ring gear 2 achieved thereby is sufficient to prevent twisting of the ring gear 2 with respect to the gearwheel 1 for all operating conditions of the printing machine which may occur.

A fourth section 20 of the pin 13 is formed with a thread on which a threaded sleeve 21 is screwed as an adjusting element. The threaded sleeve 21 is formed with a hexagon head 22 and can consequently be screwed by means of a suitable key from the illustrated position thereof in a direction towards the compression spring 15. To limit the travel of the threaded sleeve 21, the latter is formed with an annular groove 23 in which a stop 24 engages. A lever 26 engages in another annular groove 25 formed in the threaded sleeve 25. The lever 26 is pivotally mounted at a stationary location 27 and is biased by a spring 28 against a stop 29. In this position shown in FIG. 1, the lever 26 is out of contact i.e. released, from an actuating element such as a pushbutton 30 of an electric switch 31.

The operating condition of the device according to the invention wherein the gearwheel 1 and the ring gear 2 are connected or coupled to one another is represented in FIG. 1. The electric switch 31 is accordingly connected in such manner to a non-illustrated electrical control system of the printing machine, for example, that operation of the machine is possible when the device of the invention is in the position shown in FIG. 1.

FIG. 2 shows an axial sectional view of the same embodiment of the device shown in FIG. 1 but, however, in a different phase of operation thereof wherein, namely, the ring gear 2 can be twisted or turned relative to the gearwheel 1 for the purpose of converting the machine. For this purpose, starting from the illustrated position of FIG. 1, the threaded sleeve 21 is screwed farther onto the pin 13. As long as the threaded sleeve 21 and the sleeve 19 are not in contact with one another (see FIG. 1), there is no change in the position of the connection or coupling of the ring gear 2 and the gearwheel 1. The lever 26 is moved, however, until the electric switch 31 is finally actuated. The current supply for driving the printing or other machine is thereby interrupted so that start-up of the machine is prevented before the connecting or coupling force acting between the ring gear 2 and the gearwheel 1 is reduced.

By turning the threaded sleeve 21 further, the compression spring 15 is loaded via the sleeve 19, the rollers 18 and the washer 17, whereby the pressure lever 9 of the force applied thereto is received until it is finally freely movable. The ring gear 2 can then be adjusted in the required manner with respect to the gearwheel 1. The selected position is finally fixed by turning the threaded sleeve 21 in reverse rotary direction. Only after the full force of the compression spring 15 is effective at the contact regions 12 of the pressure levers 9, is the interruption of the current supply for driving the printing machine again nullified i.e. is the current supply restored, by further turning of the threaded sleeve 21.

The device illustrated in FIGS. 1 to 3 fulfills not only this reliability function but also permits an adjustment to be made with relatively few manipulations and relatively little energy expenditure. The pressure levers 9 as well as the axial thrust bearing 17, 18, 19 constructed as a roller bearing contribute considerably to the relatively slight energy expenditure.

FIG. 3 is a front elevational or end view of the first embodiment of the device according to the invention. Only a small part of the pressure levers 9, respectively, is visible from the outside through an annular gap between the clamping disc 7 and the ring gear 2. The remaining part of the pressure levers 9 is otherwise represented by broken lines which also correspond to the sides of the radial grooves 8 in which the pressure levers 9 are received.

Figure 4:
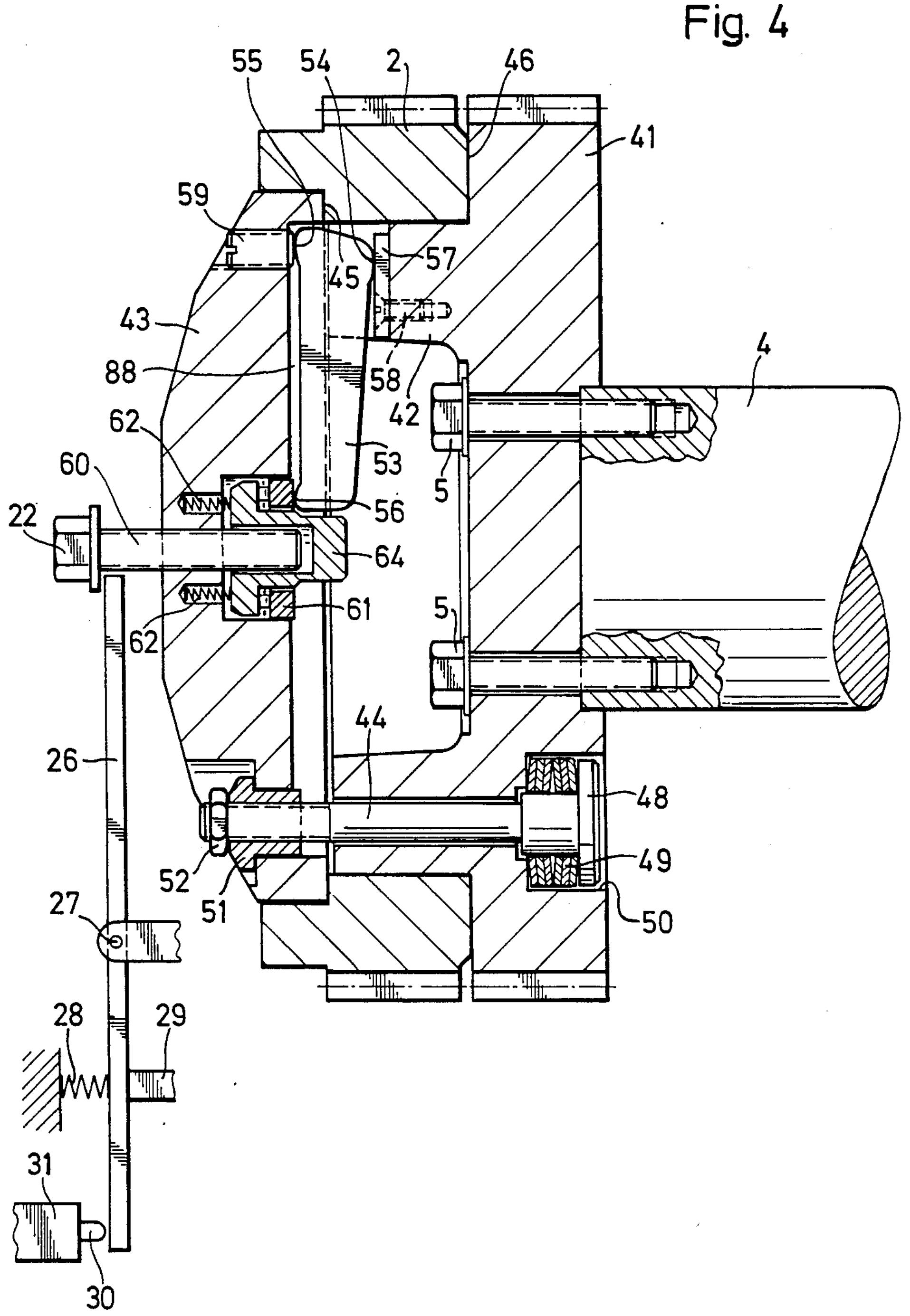
FIG. 4 is a view like that of FIG. 1 of a second embodiment of the device.

In the embodiment of the invention shown in FIG. 4, a gearwheel 41 is fastened at the end face thereof by bolts 5 to the shaft 4 in a manner similar to that of the first embodiment of FIGS. 1 to 3. The ring gear 2 is likewise turnably mounted on an annularly or ring shaped extension 42 of the gearwheel 41. The clamping disc 43, however, is not firmly connected to the gearwheel 41, but rather is pressed by clamping elements 44 distributed about the circumference of the clamping disc 43, against a shoulder 45 of the ring gear 2 which, in turn, engages the gearwheel 41 at 46. A positive connection or coupling of the ring gear 2 with the gearwheel 1 is thereby assured.

The clamping elements 44 are formed, respectively, of a bolt with a disc-shaped head 48 which serves as a support or counter-bearing for a compression spring 49 assembled of cup springs. Corresponding recesses 50 are provided in the gearwheel 41 for the compression springs 49 and the bolt heads 48 of the clamping elements 44. A nut 51 is screwed so far onto the bolt 44 that the compression spring 49 has a required pre-loading. The nut 51 is fixed or secured by a locknut 52. To loosen the coupling or connection between the ring gear 2 and the gearwheel 41, six radial pressure levers 53 are provided which are received in corresponding radial grooves 88 formed in the clamping disc 43. The pressure levers 53 are each formed with contact regions 54, 55 and 56 at which they are braced against the gearwheel 41, the clamping disc 43 and a pressure ring 61 centrally disposed in the clamping disc 43, the pressure ring 61 together with a roller cage disposed between the pressure ring 61 and a pressure flange 64 forming an axial thrust bearing.

Because the high pressure per unit area due to the curved contact regions 54, 55 and 56 of the pressure levers 53, the gearwheel 41 is provided with hardened contact platelets 57 retained by screws 58, and the clamping disc 43 is provided with hardened threaded pins 59. The latter serve further for adjusting the pressure lever 53 so as to effect an even distribution of the forces to be transferred thereby over the entire circumference of the device according to the invention.

The axial thrust bearing 61, 64 can be displaced in a direction towards the pressure levers 53 by a centrically disposed bolt 60 which is threadedly mounted in a corresponding thread of the clamping disc 43. In this regard, the bolt 60 can initially travel a distance which as yet results in no application of force upon the pressure levers 53, but within which distance, however, the actuating lever 26 is moved. Before the coupling or connecting force is reduced, the current supply to the machine drive is switched off. When the bolt 60 engages the pressure flange 64, the latter will turn with the bolt 60 relative to the pressure ring 61. Assurance is provided by the axial thrust bearing provided with the roller cage that the friction to be overcome for turning the bolt 60 is formed substantially only of the thread friction of this bolt 60.

Several helical springs 62 are arranged in a circle around the bolt 60 in corresponding bores formed in the clamping disc 43. The helical springs 62 are of such construction that, even when there is no contact between the bolt 60 and the pressure flange 64, the helical springs 62 will exert a given preloading to the thrust bearing 61, 64, and consequently will hold the pressure levers 53 in a definite position.

Figure 5:
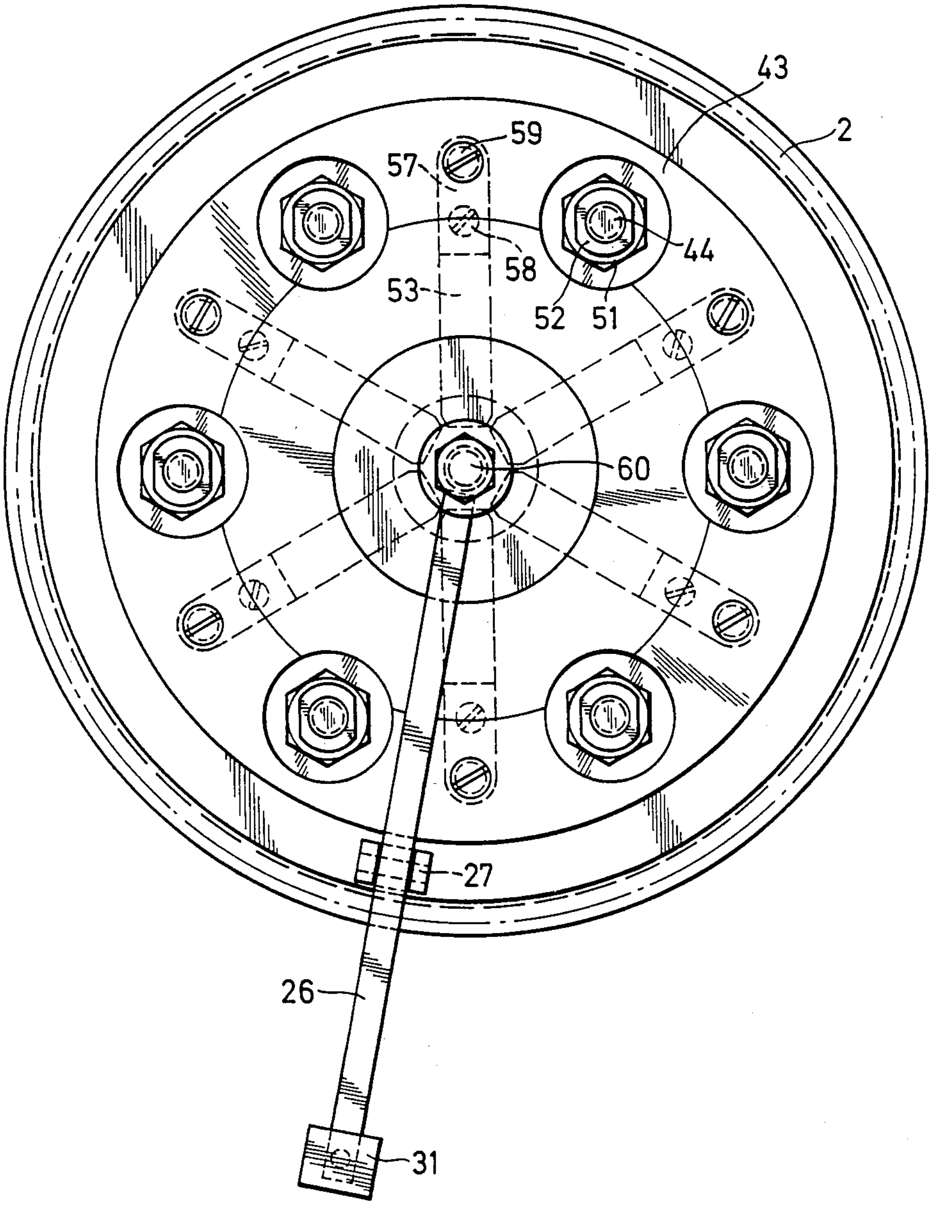
FIG. 5 is a front end view of FIG. 4.

FIG. 5 is a front elevational or end view of FIG. 4. Several parts which are of themselves not visible in the view of FIG. 5 are shown in broken lines.

Figure 6:
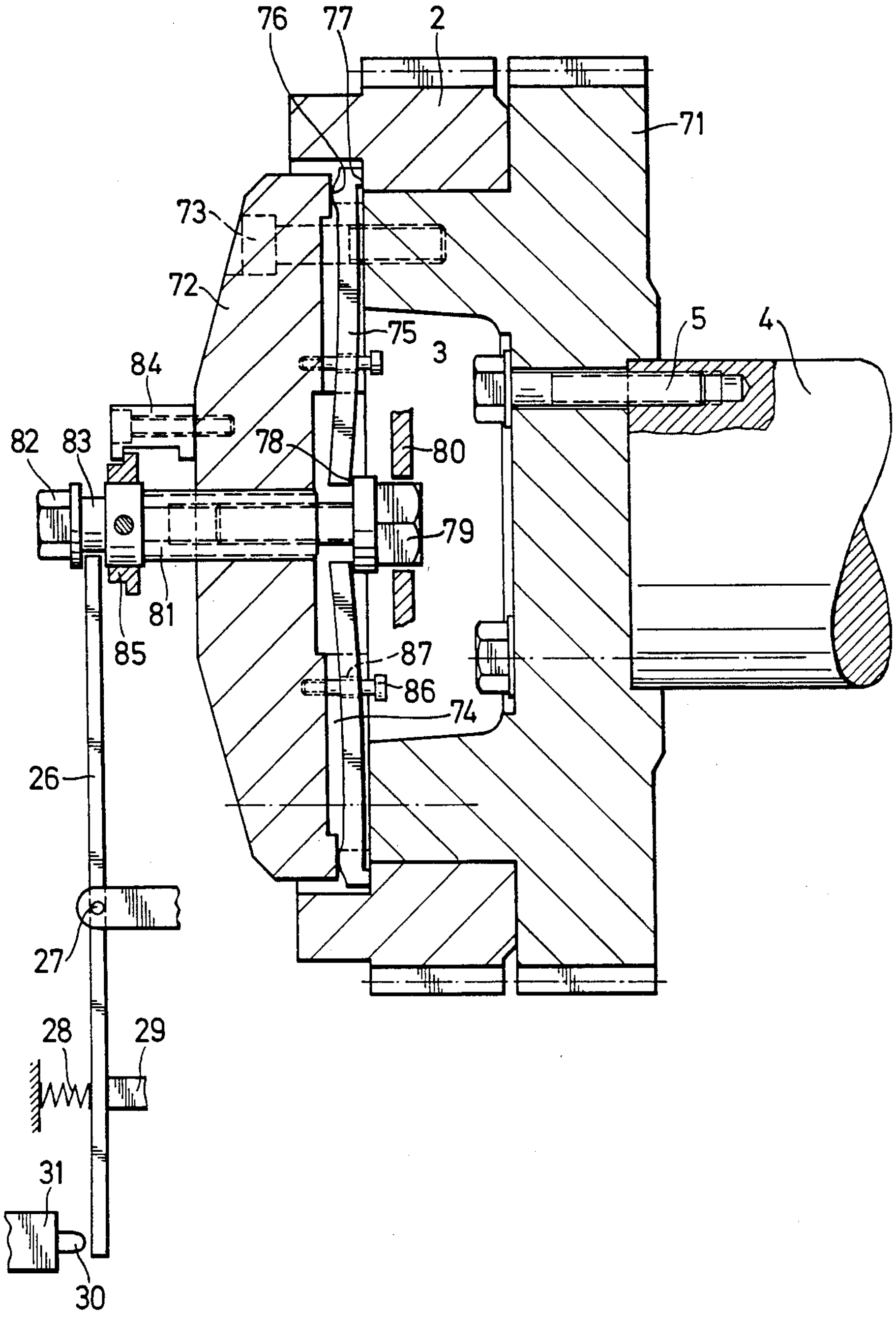
FIG. 6 is a view like that of FIGS. 1 and FIG. 4 of a third embodiment of the device.

FIG. 6 is a view like that of FIG. 1 of a third embodiment of the invention wherein the pressure levers simultaneously serve as spring elements. In the embodiment of FIG. 6, the clamping disc 72 is firmly connected or coupled with a gearwheel 71 in a manner similar to that of the embodiment shown in FIG. 1. The clamping disc 72 is formly screwed to the gearwheel 71 by bolts or screws 73, and is formed with radially extending grooves 74 through which respective pressure levers 75 extend. The pressure levers 75 have a short lever arm formed between contact regions 76 and 77 by which a positive connection or coupling of the ring gear 2 with the gearwheel 71 is effected if, as shown in FIG. 6, a contact region 78 of a long lever arm of the pressure levers 75 is loaded with a suitable force. This loading originates from a bolt 70, which is secured against torsion or turning by a conventional device 80 which is only represented diagrammatically. The bolt 79 has a shaft which is threadedly received in a sleeve 81 which is formed with both an external and an internal thread and serves as an adjusting element. The sleeve 81 can be turned by means of an hexagonal bolt head 82. The external thread of the sleeve 81 has a slightly greater pitch than that of the internal thread thereof with like pitch direction. Thereby, for each turn of the sleeve 81, an axial adjustment of the bolt 79 in the respective adjustment direction of the sleeve 81 over a distance corresponding to the difference between the pitches of both threads is achieved.

In a similar manner as for the previously described embodiments, the embodiment of FIG. 6 has a sleeve 81 provided with an annular groove 83, in which again the lever 26 for actuating the electric switch 31 engages.

In order to limit the travel of the sleeve 81, a fixed stop 84 is provided which is engageable with a counterpart 85 on the sleeve 81.

A respective pin 86 provided with a thread and screwed into the clamping disc 72 loosely extends through a bore 87 formed in each of the pressure levers 75 and serves for guiding the respective pressure lever 75.

In the position of the third embodiment shown in FIG. 6, the electric switch 31 is closed i.e. not actuated, so that the machine can be set into operation because the connection or coupling between the ring gear 2 and the gearwheel 72 is closed with the required force. Should an adjustment of the relative rotational position of the ring gear 2 with respect to the gearwheel 71 then take place, the sleeve 81 will be tuned into the clamping disc 72. In this regard, the sleeve 81 travels a relatively great distance so that already at the beginning of travel, the lever 26 and, or accordingly, the electric switch 31 are actuated. During this period, however, the bolt 79 has travelled only a relatively short distance, by which the resilient pressure levers 75 become, in fact, somewhat relaxed or relieved of tension, yet the pressure exerted thereby on the ring gear 2 is sufficient, however, to firmly hold ring gear 2 reliably. Only when the sleeve 81 is turned further do the pressure levers 75 become so relaxed or relieved of tension to such an extent that the ring gear 2 is able to turn on the gearwheel 71.

I claim:

1. Device for setting a relative rotational position of a gearwheel and a ring gear disposed coaxially mounted and turnable on an annular extension of the gearwheel, comprising a plurality of radially extending pressure levers actuatable in common by an axially adjustable, centrically disposed adjusting element for releasing a spring-biased positive connection of mutually engaging faces of the gearwheel and the ring gear by reducing the spring bias acting upon said faces, said pressure levers being loosely disposed between the annular extension of the gearwheel and a clamping disc adjacent thereto, said pressure levers being received in radial grooves formed in said clamping disc and being pivotally braced at a first contact region located between the ends thereof against one of the annular extension and said clamping disc, the adjusting element being displaceable over a distance, during a first portion of which the spring bias increases from a relatively low value to a value necessary for maintaining the relative rotational position of the gearwheel and the ring gear and, during a second portion of the distance displaceable by the adjusting element, the spring bias necessary for maintaining the relative rotational position of the gearwheel and the ring gear is at least maintained, and an electric switch connected in a supply-current circuit of a machine drive is actuatable by said element.

2. Device according to claim 1, wherein said pressure levers have relatively short lever arms between said first contact regions, respectively, and respective second contact regions located thereon, and have relatively long lever arms between said first contact regions, respectively, and respective third contact regions also located thereon, said pressure levers being braced at said first contact regions, respectively, against said clamping disc, said second contact regions, respectively, engaging a face of the ring gear facing away from the gearwheel, said third contact regions, respectively, being adjacent the axis of the gearwheel, and including spring means for applying an axially directed force to said third contact regions, said adjusting element being axially displaceable, during said first portion of said distance, independently of said spring means and, during said second portion of said distance, performing a movement loading said spring means.

3. Device according to claim 2 including a centric pin fixed against turning disposed coaxially with the gearwheel and a shaft carrying the gearwheel, said pin carrying said spring means and an axial thrust bearing, said pin also having a threaded section whereon said adjusting element is mounted.

4. Device according to claim 2, wherein said spring means comprise a compression spring formed of cup springs.

5. Device according to claim 2, wherein said adjusting element is formed with an annular groove, and including an actuating element for said electric switch engaging in said annular groove.

6. Device according to claim 2, wherein said adjusting element is formed with an annular groove, and including a stop for limiting adjustment travel of said adjusting element, said stop engaging in said annular groove.

7. Device according to claim 3, wherein said third contact regions of said pressure levers, respectively, engage a diametrically enlarged disc of said axial thrust bearing.

8. Device according to claim 1, including a plurality of springy clamping elements distributed around the circumference of the ring gear for clamping the ring gear between the gearwheel and said clamping disc, said pressure levers being braced at said first contact regions, respectively, thereof against an end face of the annular extension of the gearwheel, said second contact regions, respectively, of said pressure levers being braced against said clamping disc at respective radially outer regions of said radial grooves, and said third contact regions, respectively, of said pressure levers being braced against an axial thrust bearing centrically inserted in said clamping disc and axially adjustable by means of said adjusting element, a respective relatively short lever arm being formed between the respective first and second contact regions of said pressure levers, and a respective relatively long lever arm being formed between the respective first and third contact regions of said pressure levers.

9. Device according to claim 8, wherein said adjusting element comprises a bolt threadedly secured in a threaded bore formed in said clamping disc, an end of said bolt engaging in a centric bore formed in a pressure flange, said pressure flange extending into a centric recess formed in said clamping disc, and said pressure flange being in engagement with said third contact regions of said pressure levers, respectively, via a side of a pressure ring of said axial thrust bearing which faces away from said clamping disc.

10. Device according to claim 8, including hardened intermediate members disposed at locations of the gearwheel and of said clamping disc which come into contact with said pressure levers.

11. Device according to claim 10, wherein said intermediate members disposed at said locations of said clamping disc are formed as threaded pins.

12. Device according to claim 1, wherein said pressure levers have relatively short lever arms between said first contact regions and second contact regions thereof, respectfully, and have relatively long lever arms between said first contact regions and third contact regions thereof respectively, and are in contact with said clamping disc via said first contact regions, respectively, and with an end face of the ring gear facing away from the gearwheel via said second contact regions respectively, said adjusting element being centrically inserted into said clamping disc and said pressure levers being elastically deformable by application of a force from said adjusting element on said third contact regions, respectively.

13. Device for setting a relative rotational position of a gearwheel and a ring gear disposed coaxially mounted and turnable on an annular extension of the gearwheel, comprising a plurality of radially extending pressure levers actuatable in common by an axially adjustable, centrically disposed adjusting element for releasing a spring-biased positive connection of mutually engaging faces of the gearwheel and the ring gear by reducing the spring bias acting upon said faces, said pressure levers being loosely disposed between the annular extension of the gearwheel and a clamping disc adjacent thereto, said pressure levers being received in radial grooves formed in said clamping disc and being pivotally braced at a first contact region located between the ends thereof against one of the annular extension and said clamping disc, the adjusting element being displacable over a distance, during a first portion of which the spring bias increases from a relatively low value to a value necessary for maintaining the relative rotational position of the gearwheel and the ring gear and, during a second portion of the distance displaceable by the adjusting element, the spring bias necessary for maintaining the relative rotational position of the gearwheel and the ring gear is at least maintained, and an electric switch connected in a supply-current circuit of a machine drive is actuatable by said element, said pressure levers having relatively short lever arms between said first contact regions and second contact regions thereof, respectfully, and having relatively long lever arms between said first contact regions and third contact regions thereof respectively, and being in contact with said clamping disc via said first contact regions, respectively, and with an end face of the ring gear facing away from the gearwheel via said second contact regions respectively, said adjusting element being centrically inserted into said clamping disc and said pressure levers being elastically deformable by application of a force from said adjusting element on said third contact regions, respectively, said adjusting element comprising a sleeve having an internal and an external thread and being threadedly mounted in a centric threaded bore formed in said clamping disc, and a bolt mounted in said sleeve and cooperatively connected with said internal thread of said sleeve, said bolt being axially displaceable yet fixed against turning, said third contact region of said pressure levers, respectively, being in contact with a contact surface of a head of said bolt, said external and said internal threads of said sleeve having respective pitches which differ slightly from one another.

14. Device according to claim 1, including means for limiting travel of said adjusting element.

* * * * *